(12) United States Patent
Lee et al.

(10) Patent No.: US 10,749,365 B2
(45) Date of Patent: *Aug. 18, 2020

(54) POWER SUPPLY METHOD AND ELECTRONIC CARD USING THE SAME

(71) Applicant: KONA I CO., LTD., Seoul (KR)

(72) Inventors: Seung Gi Lee, Incheon (KR); Jung Bong Nam, Seoul (KR); Byeong Ryong Mun, Seoul (KR)

(73) Assignee: KONA I CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,840

(22) Filed: May 16, 2019

(65) Prior Publication Data

US 2019/0273385 A1    Sep. 5, 2019

Related U.S. Application Data

(63) Continuation of application No. 15/876,936, filed on Jan. 22, 2018, now Pat. No. 10,340,720.

(30) Foreign Application Priority Data

Aug. 31, 2017  (KR) .......................... 10-2017-0111421

(51) Int. Cl.
| | |
|---|---|
| *G06K 19/06* | (2006.01) |
| *H02J 7/02* | (2016.01) |
| *G06K 19/07* | (2006.01) |
| *H02J 50/10* | (2016.01) |
| *H02J 7/00* | (2006.01) |

(52) U.S. Cl.
CPC .......... *H02J 7/022* (2013.01); *G06K 19/0712* (2013.01); *G06K 19/0715* (2013.01); *G06K 19/0723* (2013.01); *H02J 7/008* (2013.01); *H02J 7/025* (2013.01); *H02J 50/10* (2016.02)

(58) Field of Classification Search
CPC ....................... G06K 19/0723; G06K 19/0713
USPC ......................................... 235/492
See application file for complete search history.

(56) References Cited

U.S. PATENT DOCUMENTS

2011/0147468 A1 *  6/2011  Park .................. G06K 19/0704
                                              235/492

FOREIGN PATENT DOCUMENTS

| | | |
|---|---|---|
| JP | H11-345292 A | 12/1999 |
| JP | 2007-133558 A | 5/2007 |
| JP | 2014-235546 A | 12/2014 |
| KR | 10-2005-0026669 A | 3/2005 |
| KR | 10-1566831 B1 | 11/2015 |

* cited by examiner

*Primary Examiner* — Jamara A Franklin
(74) *Attorney, Agent, or Firm* — Novick, Kim & Lee, PLLC; Sang Ho Lee

(57) ABSTRACT

Provided is a power supply method for efficient operation of electronic cards and an electronic card using the same, and the power supply method may include the steps of: charging a charging unit through the DC power supplied from a rectification unit; enabling, when a constant voltage enable signal is applied, a system constant voltage unit if a predefined condition is satisfied; and supplying power to a system unit when the system constant voltage unit is enabled.

18 Claims, 4 Drawing Sheets

POWER SUPPLY METHOD AND ELECTRONIC CARD USING THE SAME

CROSS-REFERENCE TO RELATED APPLICATIONS

This application is a continuation of U.S. patent application Ser. No. 15/876,936 filed on Jan. 22, 2018, and claims priority under 35 U.S.C. § 119 to Korean Patent Application No. 10-2017-0111421 filed Aug. 31, 2017, in the Korean Intellectual Property Office, the entire contents of which are hereby incorporated by reference.

BACKGROUND

The present disclosure is related to a power supply method for efficient operation of electronic cards and an electronic card using the same, and more particularly, relates to a power supply method using an energy harvesting circuit and an electronic card using the same.

Getting out of the method of a conventional magnetic card which records card information on a magnetic stripe, a smart card may store the information in an integrated circuit (IC) chip and includes various types of card, such as a card giving and receiving information in a contact or contactless method, a hybrid card and a combination card. Meanwhile, the smart card may have a secure element with improved security since various secure information for making a payment is stored therein.

As the smart cards are also used for transaction certification or user authentication, as well as payment, they are developed as electronic cards of various forms by adding a one-time password (OTP) function, a bioinformation recognition function or the like.

As various functions are added to the electronic cards unlike existing smart cards, each component of the electronic cards consumes power, and the electronic cards employ a method of using its own battery. However, since the size, run time, charging method or the like of the battery does not meet conditions for commercializing the electronic cards, powerless electronic cards are developed recently. As a prior technique, a powerless information processing device of Korea Patent Registration No. 10-0537903 shows an example of a powerless IC card.

SUMMARY

Therefore, the present invention has been made in view of the problems of the conventional electronic cards provided with a battery, and it is an object of the present disclosure to provide a power supply method for accomplishing efficient supply of power and operation of powerless electronic cards and an electronic card using the same.

A first aspect of the present disclosure relates to a power supply method implemented in an electronic card, and the power supply method may include the steps of charging a charging unit through DC power supplied from a rectification unit, enabling, when a constant voltage enable signal is applied, a system constant voltage unit if a predefined condition is satisfied, and supplying power to a system unit when the system constant voltage unit is enabled, wherein the system constant voltage unit receives the DC power together with the charging unit and may be in a disabled state until the constant voltage enable signal is received.

A second aspect of the present disclosure relates to an electronic card using the power supply method, and the electronic card may include, a rectification unit for generating DC power by converting current induced from an antenna, a charging unit charged with the DC power supplied from the rectification unit, a system constant voltage unit for receiving the DC power together with the charging unit, being in a disabled state until a constant voltage enable signal is received, being enabled when a predefined condition is satisfied, and supplying power to a system unit; and the system unit for receiving power and operating when the system constant voltage unit is enabled.

At this point, the predefined condition may include a first condition that the charging unit has a charged capacity higher than a predefined reference value and a second condition of receiving the constant voltage enable signal from the rectification unit.

In addition, the electronic card may further include a voltage level recognition unit for monitoring a power supply state to determine whether the predefined condition is satisfied, and the voltage level recognition unit may determine whether the predefined condition is satisfied and transmit an enablement signal to the system constant voltage unit if the predefined condition is satisfied.

The system unit may include a module for implementing at least one application function provided by the electronic card and operate using the power received from the system constant voltage unit.

As another embodiment, the predefined condition may further include a third condition of supplying power through a contact-type interface of the electronic card, and if power is supplied through the contact-type interface, the voltage level recognition unit may determine that the predefined condition is satisfied and enable the system constant voltage unit.

In addition, the electronic card may further include a system interface unit for grasping an applied power state and a power use state of the system unit and transferring the states to the voltage level recognition unit, and the system interface unit may include: a system NFC recognition unit for sensing a wireless communication signal received from the rectification unit; and a system power control unit for transmitting a power supply maintaining signal to the voltage level recognition unit when power of the system unit needs to be maintained.

Here, the system power control unit may receive a potential level reduction signal from the system NFC recognition unit and transmit the power supply maintaining signal to the voltage level recognition unit if it is determined that power of the system unit needs to be maintained.

According to an embodiment, when the power supply maintaining signal is received, the voltage level recognition unit may enable the system constant voltage unit for a predetermined time period regardless of whether the predefined condition is satisfied.

BRIEF DESCRIPTION OF THE DRAWINGS

In a plurality of drawings, like reference numerals indicate like components.

DETAILED DESCRIPTION

Figure 1:
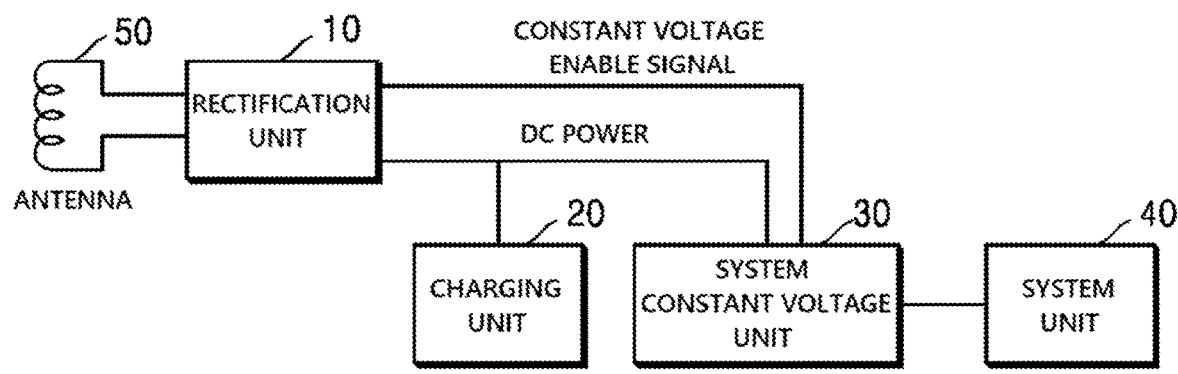
FIG. 1 is a block diagram showing the configuration of an electronic card according to a first embodiment of the present disclosure.

In the present disclosure, as a specific structural or functional description given to embodiments in accordance with concepts of the present disclosure will be illustrated for the purpose of describing only embodiments according to the concepts of the present disclosure, the embodiments according to the concepts of the present disclosure may be embodied in various forms, but should not be limited the embodiments described herein.

Since the embodiments according to the concepts of the present disclosure may be embodied in many different forms, these embodiments will be described in detail with reference to accompanying drawings. However, these embodiments according to the concepts of the present disclosure should not be construed as being limited to the embodiments set forth herein. Accordingly, those of ordinary skill in the art will recognize that modification, equivalent, and/or alternative on the various embodiments described herein can be variously made without departing from the scope and spirit of the present disclosure.

The terms, such as "first", "second", and the like used herein may refer to various elements of various embodiments of the present disclosure, but do not limit the elements. Such terms may be used to distinguish one element from another element. For example, without departing the scope in accordance with the concepts of the present disclosure, a first element may be referred to as a second element, and similarly, a second element may be referred to as a first element.

It will be understood that when an element is referred to as being "(operatively or communicatively) coupled with/to" or "connected to" another element, it can be directly coupled with/to or connected to the other element or an intervening element may be present. In contrast, when an element is referred to as being "directly coupled with/to" or "directly connected to" another element, it should be understood that there are no intervening element. Similarly, words such as "between", "directly between", "adjacent to", "directly adjacent to", and the like should be interpreted in a like fashion.

Terms used in this specification are used to describe embodiments of the present disclosure and are not intended to limit the scope of the present disclosure. The terms of a singular form may include plural forms unless otherwise specified. The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

FIG. 1 is a block diagram illustrating the configuration of an electronic card 100 according to an embodiment of the present disclosure. An electronic card 100 may include an antenna 50, a rectification unit 10 for generating DC power by converting RF or NFC signals received by the antenna, a charging unit 20 for storing the DC power, a system unit 40 for operating various electronic circuits added to a smart card, and a system constant voltage unit 30 for supplying stable voltage to the system unit. Since the electronic card 100 according to an embodiment of the present disclosure is a powerless electronic card and supplies power to the system unit 40 using the rectification unit 10, the charging unit 20 and the system constant voltage unit 30, the components 10 and 20 or 10 to 30 may be named as an energy harvesting circuit or an energy harvester.

The antenna 50 performs a function of receiving RF signals wirelessly transmitted from a contactless-type card reader installed outside. For example, when the contactless-type card reader loads a data on an AC signal or a carrier wave having a predetermined frequency, the current flowing through an RF antenna provided in the card reader is converted into a wireless signal, and induced current is generated in the antenna 50 provided in the smart card according to an electromagnetic induction phenomenon.

Although a single antenna 50 may be provided in the electronic card 100 in an embodiment, in another embodiment, the electronic card 100 may be implemented to include two or more antennas such as a power antenna, a communication antenna and the like. For example, the electronic card 100 is separately provided with a system driving antenna for supplying power to the system and an antenna dedicated to a smart card chip and has a structure of physically separating these two antennas from each other, and it is configured not to use the system driving antenna in wireless communication for data transmission, but to use only for receiving power. According to this, there is an effect of increasing the capacity of power that the smart card receives from the card reader and improving stability of RF communication between the card reader and the smart card.

The rectification unit 10 is a component for generating DC power by converting the current induced from the antenna 50 and may be implemented, for example, in the form of a rectification circuit using a diode. Since the current induced from the antenna 50 is AC current whereas the system unit 40 which needs power operates using DC power, the rectification unit 10 converts the RF signals received from the antenna 50 into DC power.

The charging unit 20 is a means for storing the DC power supplied from the rectification unit 10 and may be implemented, for example, as a secondary cell or a super capacitor. The super capacitor is particularly focused on improving performance of electric capacity among the performances of a capacitor (condenser) and may be used for the purpose of a battery, and a capacitor used in an electronic circuit has a function electrically the same as that of a rechargeable battery. In an embodiment, the charging unit 20 may be charged with the DC power applied from the rectification unit 10 and may be implemented to charge to the capacity of the charging unit 20 in a short time, for example, about one second, and thus spontaneous power needed for system operation may be accumulated in the charging unit 20 only by contacting the electronic card 100 to the reader for a short time period.

The system constant voltage unit 30 is a component for supplying power to the system unit 40 by a predefined signal and may be implemented, for example, using a transistor, a field effect transistor (FET), a switch, a regulator or the like. In an embodiment, the system constant voltage unit 30 may be implemented to be enabled only when power is supplied from NFC and supply power to the system unit 40.

In a general circuit of the prior art, it is general that power is supplied to the charging unit and the system constant voltage unit at the same time, and the power supplied to the system constant voltage unit is also transferred to the system unit. When the charging unit and the system unit are supplied with power at the same time like this, the charging time is extended as much as the time of supplying power to the system. In addition, since the system operates at a potential lower than an operation potential in some cases, there is a problem of occurring a malfunction and consuming current more than general consumption of current as the system becomes instable.

The present disclosure is a technique devised to solve the problems, and although DC power is supplied to the charging unit 20 and the system constant voltage unit 30 at the same time, the system constant voltage unit 30 may be configured to operate in a disabled state until the charged capacity of the charging unit 20 reaches a reference value. While the charging unit 20 is charged more than the reference value, the system constant voltage unit 30 may be enabled by a constant voltage enable signal generated when NFC power is applied. Here, the constant voltage enable signal includes a DC power signal according to a predetermined reference. If the system constant voltage unit 30 is enabled, it also supplies power to the system unit 40.

According to the power supply method as described above, since the charging unit 20 does not supply power to the system unit if there is no constant voltage enable signal, natural discharge does not occur, and power remains. Then, since the remaining power and the power supplied from the NFC are used when a transaction is made, charging time of the charging unit 20 is relatively shortened.

The system unit 40 operates using the DC power supplied from the system constant voltage unit 30 and may include components for operating various application modules added to the smart card. For example, when the smart card is provided with a display for displaying a balance or a transaction status, the system unit 40 may include a display module and an MCU module for driving the display module. Since the system unit 40 of the present disclosure receives power and operates only when the system constant voltage unit 30 is enabled, it may perform stable operation without generating a malfunction at a low potential.

Like this, the present disclosure may adjust supply of power to the system unit 40 by selectively enabling or disabling the system constant voltage unit 30. In addition, there is an effect of accomplishing reduction of charging time and a stable charged capacity by intensively charging the charging unit 20 when the system constant voltage unit is disabled.

Although not shown in the figure, the electronic card 100 may further include components such as a Micro Processor Unit (MPU) having its own operation function, Read Only Memory (ROM) for storing a Chip Operation System (COS), Electrically Erasable Programmable Read Only Memory (EEPROM) for storing application programs and data thereof, Random Access Memory (RAM) for temporarily storing data including a variety of variables, an I/O interface for exchanging data with the outside of the smart card chip and the like.

In addition, although it has been described focusing on the operation according to contactless communication using an antenna in the first embodiment, it is not limited thereto, and this embodiment may be applied even when DC power is received through a contact-type interface.

Figure 2:
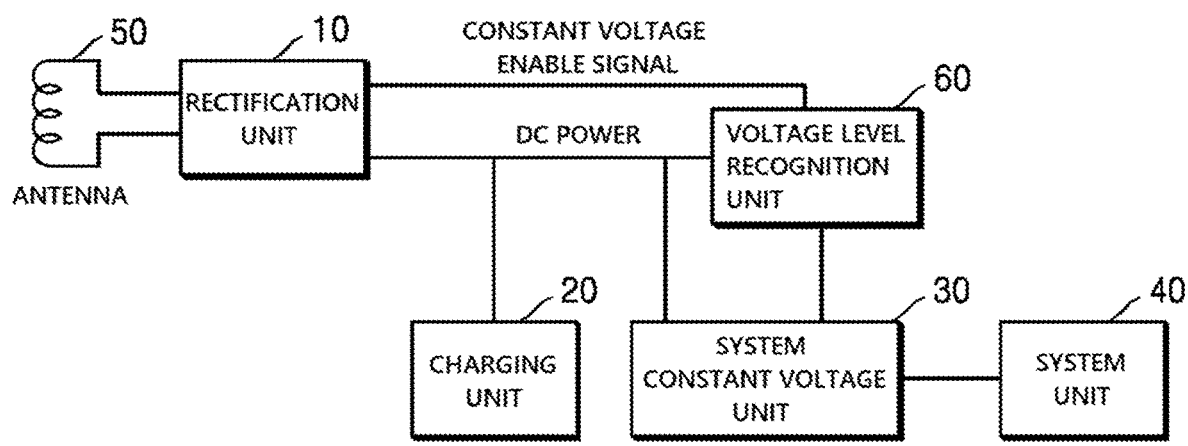
FIG. 2 is a block diagram showing the configuration of an electronic card according to a second embodiment of the present disclosure.

FIG. 2 is a block diagram showing the configuration of an electronic card according to a second embodiment of the present disclosure. In a manner the same as described in the first embodiment, an electronic card 200 may include an antenna 50, a rectification unit 10 for generating DC power by converting RF or NFC signals received by the antenna, a charging unit 20 for storing the DC power, a system unit 40 for operating various application modules added to a smart card, and a system constant voltage unit 30 for supplying stable voltage to the system unit. In addition, the electronic card 200 according to a second embodiment may further include a voltage level recognition unit 60 for enabling the system constant voltage unit 30.

In a manner the same as described in the first embodiment, when the electronic card 200 performs contact or contactless communication with a reader, it converts the current received through the antenna 50 into DC power through the rectification unit 10 and supplies the DC power to the charging unit 20 and the system constant voltage unit 30 at the same time. At this point, the system constant voltage unit 30 may be implemented to operate in a disabled state until the charged capacity of the charging unit 20 reaches a reference value. While the charging unit 20 is charged more than the reference value, the system constant voltage unit 30 may be enabled by a constant voltage enable signal generated when NFC power is applied. When the system constant voltage unit 30 is enabled, it also supplies power to the system unit 40.

According to the power supply method as described above, since the power remaining in the charging unit 20 and the power supplied from NFC are used, charging time is shortened. Since the components 10 to 50 described above operate in a manner the same as described in the first embodiment, detailed descriptions thereof will be omitted.

The voltage level recognition unit 60 is a module for monitoring a power apply state and determining whether the system constant voltage unit 30 is enabled and may be configured as a semiconductor chip, a circuit or the like. The voltage level recognition unit 60 may sense a voltage level of the charging unit 20 and sense the constant voltage enable signal generated when NFC power is applied. In an embodiment, the voltage level recognition unit 60 may monitor whether the voltage of the charging unit is equal to or higher than a reference value (e.g., 2.3V).

Figure 3:
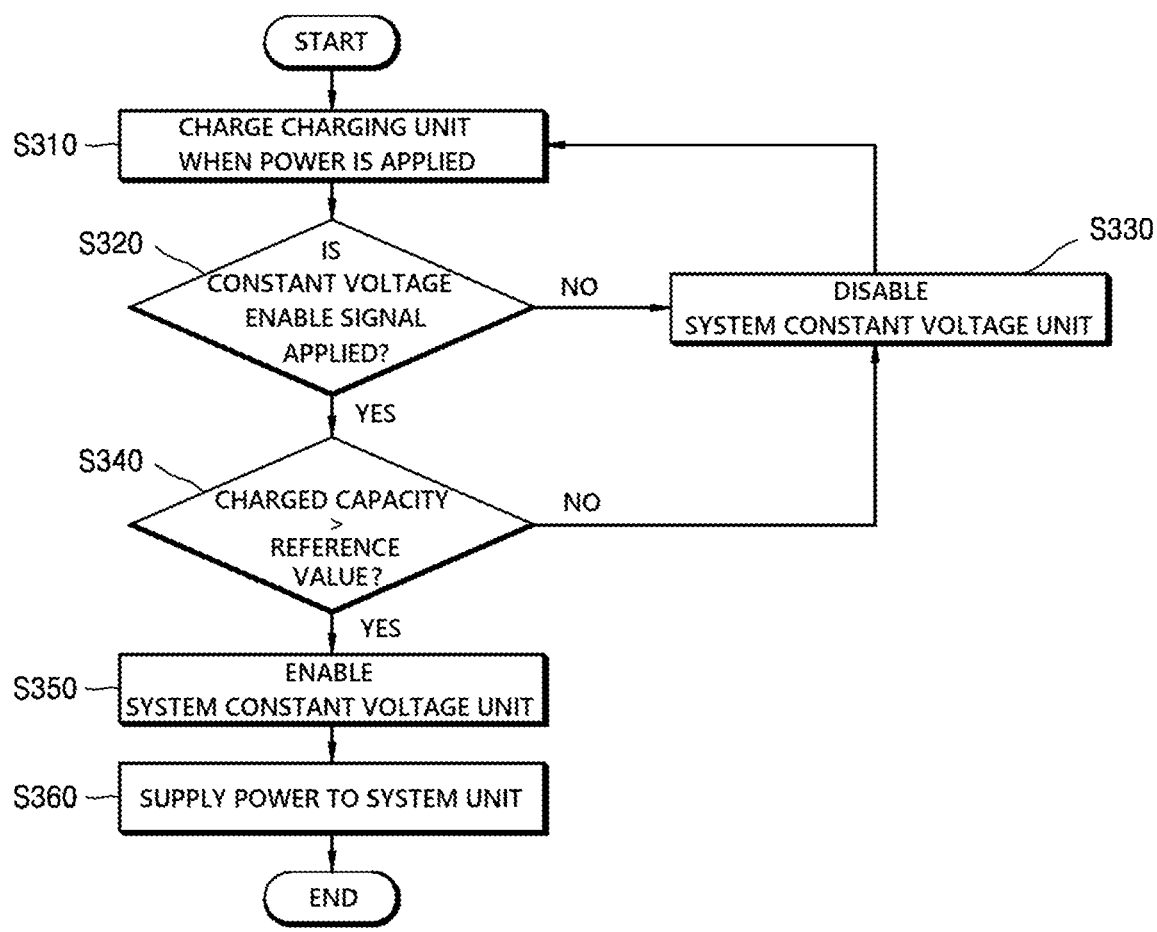
FIG. 3 is a flowchart illustrating a power supply method of an electronic card according to a second embodiment of the present disclosure.

A power supply method using the voltage level recognition unit 60 is described in further detail with reference to FIG. 3. Referring to FIG. 3, if DC power is supplied through the rectification unit 10 when power is applied through a reader, the charging unit 20 may be charged (step S310). For example, the DC power can be used only to charge the charging unit. However, when the charging unit 20 is charged thereafter, since there is remaining power in the charging unit 20, charging time is minimized, and thus the system constant voltage unit 30 may be enabled immediately when NFC power is applied through the reader.

The voltage level recognition unit 60 may monitor whether the constant voltage enable signal is applied (a first condition) and the charged capacity of the charging unit 20 (a second condition) (steps S320 and S340). Although it is shown in FIG. 3 that whether the charged capacity is higher than a reference value is determined after determining first whether the constant voltage enable signal is applied, it is not limited thereto, and it may be implemented to change the order of steps S320 and S340 or to perform the steps simultaneously. In the embodiment of FIG. 3, the voltage level recognition unit 60 may determine whether the constant voltage enable signal is generated through wireless communication such as NFC, and determine whether the charged capacity of the charging unit 20 is higher than a predetermined reference value when the constant voltage enable signal is applied. The voltage level recognition unit 60 may transfer an enablement command to the system constant voltage unit 30 when both the first condition related to the constant voltage enable signal and the second condition related to the charged capacity are satisfied. Contrarily, when the constant voltage enable signal is not applied or the charged capacity is lower than the reference value, the voltage level recognition unit 60 may maintain the disabled state of the system constant voltage unit 30 (step S330).

If the system constant voltage unit 30 is enabled, the applied power is supplied to the system unit 40 through the system constant voltage unit 30 (steps S350 and S360). The system unit 40 may be supplied with the power and operate various functions of the electronic card 200.

Through the power supply method as described above, the charging time of the charging unit 20 can be reduced to the maximum, and stable operation of the system unit 40 can be supported. In addition, it is implemented to prevent natural discharge of the power of the charging unit 20 and to supply power to the system unit 40 only when NFC power is applied.

Figure 6A:
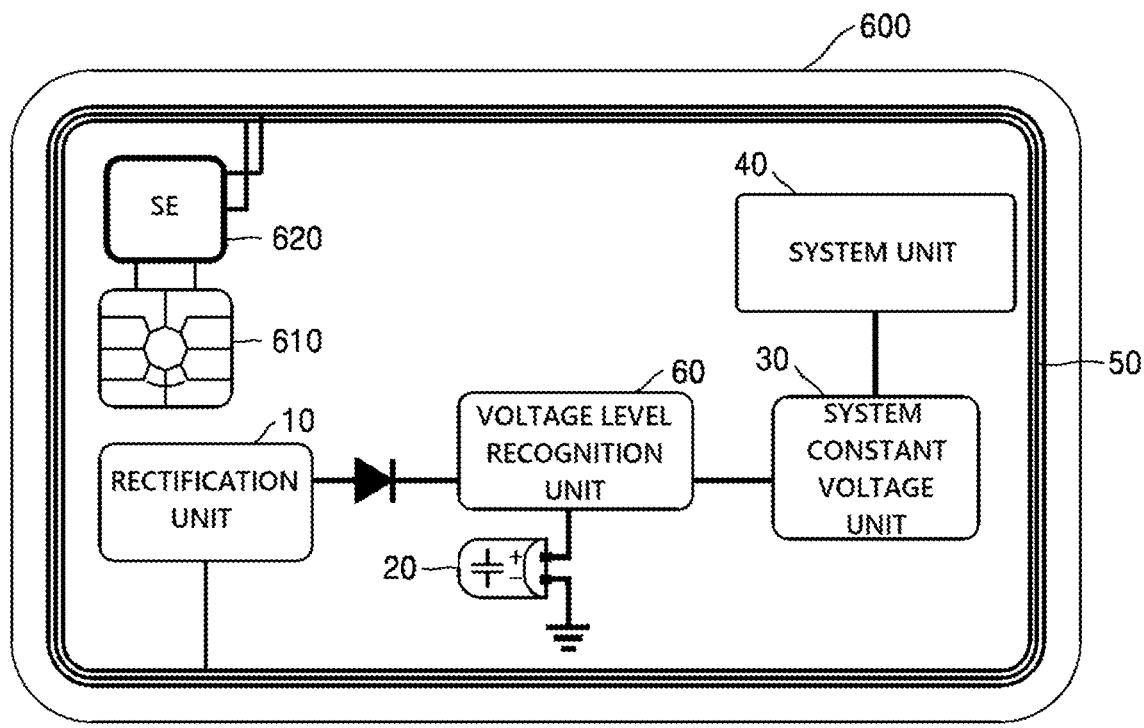
FIGS. 6A and 6B are exemplary views showing the configuration of an electronic card according to an embodiment of the present disclosure.
Figure 6B:
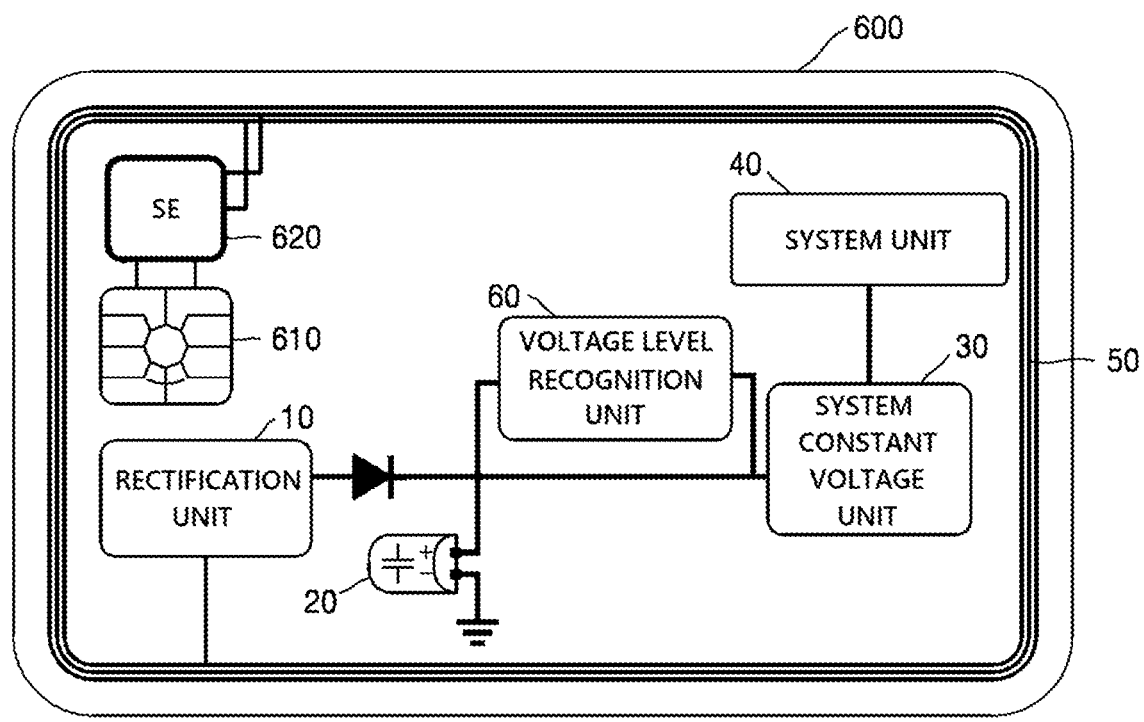

In relation to the second embodiment, FIGS. 6A and 6B are exemplary views showing the configuration of an electronic card according to an embodiment of the present disclosure. In the embodiment, an electronic card 600 may be implemented to include an antenna 50, a rectification unit 10, a charging unit 20, a voltage level recognition unit 60, a system constant voltage unit 30 and a system unit 40 and may further include a security element (SE) 620 and a COB pad 610 of the electronic card 600. The security element 620 is a secure element and performs various functions for processing, storing and encrypting information which needs security in operating the electronic card 600. The COB pad 610 is connected to a contact terminal of the security element 620 and may supply communication data or power to the security element 620 through a reader.

Meanwhile, to supply power to the system unit 40 which performs various application functions according to an embodiment of the present disclosure, the charging unit 20 is charged if DC power is applied through the rectification unit 10, and enablement or disablement of the system constant voltage unit 30 is determined according to the determination of the voltage level recognition unit 60. As described above, the voltage level recognition unit 60 determines whether a constant voltage enable signal is generated through wireless communication such as NFC and determines whether the charged capacity of the charging unit 20 is higher than a preset reference value.

If both the condition of applying the constant voltage enable signal and the condition of the charged capacity higher than the reference value are satisfied, the voltage level recognition unit 60 may transfer an enablement command to the system constant voltage unit 30. Contrarily, if the constant voltage enable signal is not applied or the charged capacity is lower than the reference value, the voltage level recognition unit 60 may maintain the disabled state of the system constant voltage unit 30. If the system constant voltage unit 30 is enabled, the applied power is supplied to the system unit 40 through the system constant voltage unit 30.

As shown in FIGS. 6A and 6B, the voltage level recognition unit 60 may be arranged between the rectification unit 10 and the charging unit 20 to sense the charged capacity of the charging unit 20 and a signal applied through the rectification unit 10 and connected to the system constant voltage unit 30 to transfer the enablement signal. In an embodiment, although the voltage level recognition unit 60 and the system constant voltage unit 30 are shown as separate components, the components 60 and 30 may also be implemented in an integrated form.

In addition, although it has been described focusing on the operation according to contactless communication using an antenna in a manner the same as described in the first embodiment, it is not limited thereto, and this embodiment may be applied even when DC power is received through a contact-type interface.

Figure 4:
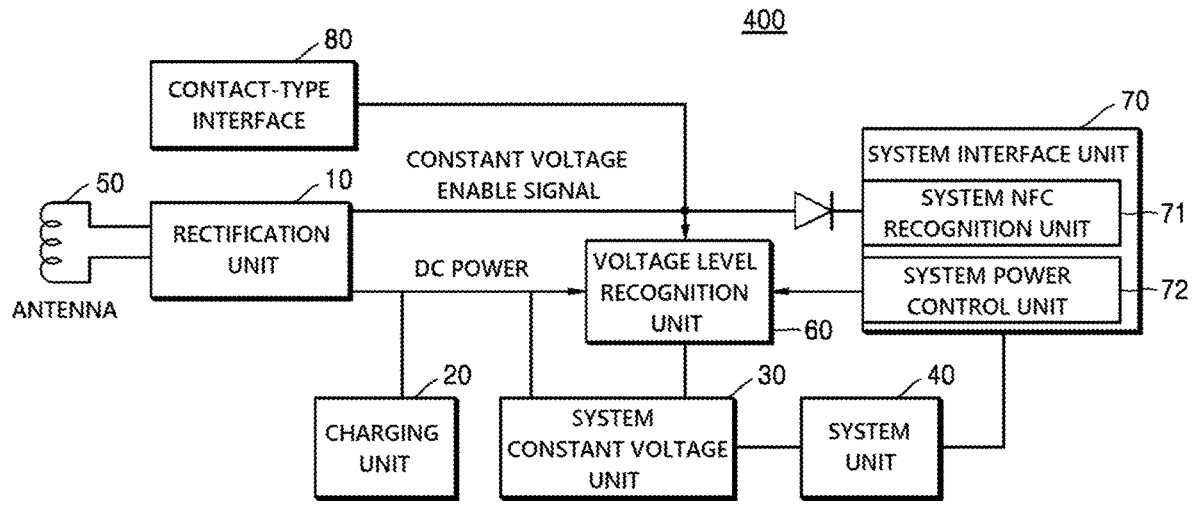
FIG. 4 is a block diagram showing the configuration of an electronic card according to a third embodiment of the present disclosure.
Figure 5:
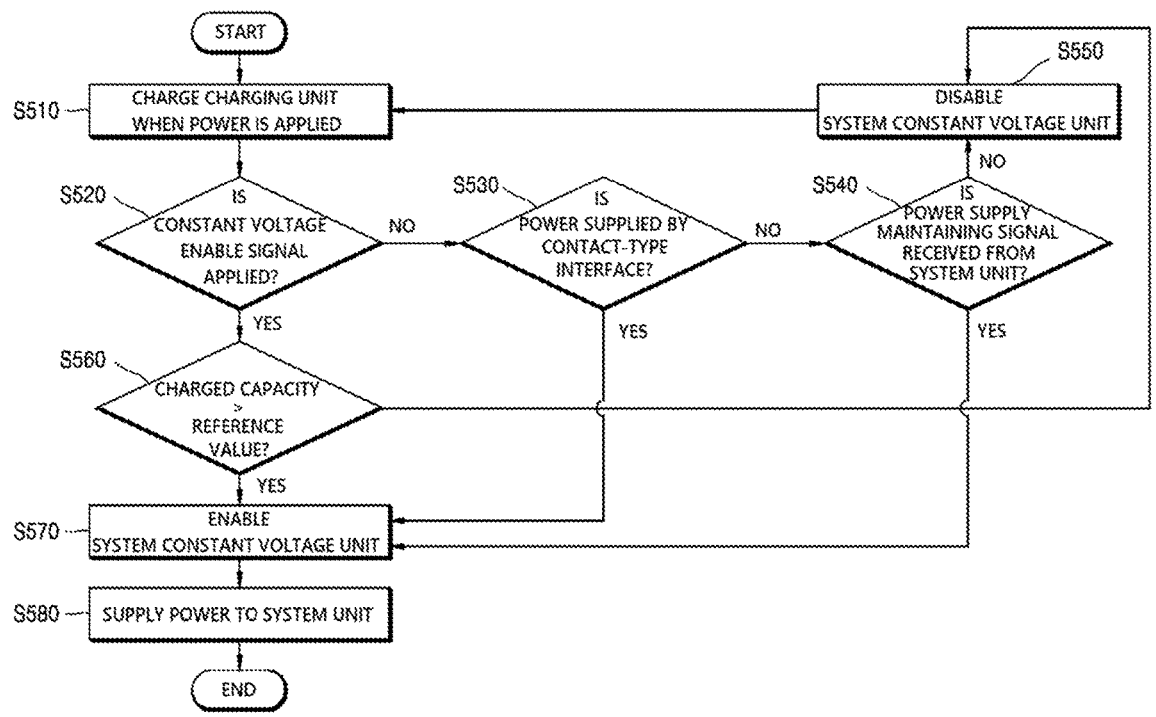
FIG. 5 is a flowchart illustrating a power supply method of an electronic card according to a third embodiment of the present disclosure.

FIG. 4 is a block diagram showing the configuration of an electronic card 400 according to a third embodiment of the present disclosure, and FIG. 5 is a flowchart illustrating a power supply method of the electronic card according to a third embodiment of the present disclosure. The third embodiment relates to a configuration additionally including a system interface unit 70 in the configuration of the electronic card 200 described in FIG. 2.

The system interface unit 70 is a component for supplying power to the system unit 40 even when the system constant voltage unit 30 does not satisfy the enablement condition and may transfer a signal for requesting supply of power in a predetermined case. In an embodiment, the system interface unit 70 may include a system NFC recognition unit 71 and a system power control unit 72.

The system NFC recognition unit 71 may recognize a case in which the electronic card 400 moves away from an NFC terminal (or a reader) by sensing a level of DC power flowing into the electronic card 400. For example, when the power level begins to decrease below a predefined reference value, the system NFC recognition unit 71 may sense that the electronic card 400 moves away from the NFC terminal and supply of power can be interrupted soon.

However, if it is recognized that the system unit 40 needs to continuously operate even after the supply of power is interrupted, the system constant voltage unit 30 may be enabled for a predetermined time period through the system power control unit 72.

In an embodiment, the system power control unit 72 may receive a power level sensing signal from the system NFC recognition unit 71. At this point, when power of the system unit 40 should be maintained (e.g., when the system unit 40 includes a display unit and needs to operate for a few seconds or minutes more), the system power control unit 72 may transfer a power supply maintaining signal to the voltage level recognition unit 60. When the voltage level recognition unit 60 receives the power supply maintaining signal from the system power control unit 72, the voltage level recognition unit 60 may keep the system constant voltage unit 30 enabled for a predetermined time period regardless of the constant voltage enable signal (a first condition) and the charged capacity of the charging unit 20 (a second condition).

This is to make up for the problem of interrupting supply of power to the system unit 40 as supply of NFC power is interrupted although power should be supplied to maintain operation of the system unit 40 during the operation of the electronic card 400, and this may guarantee stable operation of the system unit 40.

In another embodiment, the voltage level recognition unit 60 may be implemented to enable the system constant voltage unit 30 even when the electronic card 400 is supplied with power through a contact-type reader. In the embodiments described above, although it is described the system constant voltage unit 30 receives the constant voltage enable signal when the voltage level recognition unit 60 is supplied with power through NFC communication, additionally, the system constant voltage unit 30 may be enabled when power is applied by a contact-type interface 80.

To describe the power supply method according to the third embodiment, referring to FIG. 5, charge of the charging unit 20 may be performed when power is applied (step S510). At this point, application of power includes application of power through contactless communication (e.g., NFC) and application of power supplied to the contact-type interface 80 of the COB pad 610 through contact communication. When power is applied, the charging unit 20 may be charged, and although time is required to charge the charging unit 20 when the charging unit 20 is charged initially, the charging time of the charging unit 20 is reduced thereafter by the remaining power.

First, as described above with reference to FIG. 3, the voltage level recognition unit 60 may determine enablement or disablement of the system constant voltage unit 30 by determining whether the constant voltage enable signal is applied and determining whether the charged capacity is higher than a reference value (steps S520 and S560).

In another embodiment, if power is supplied by the contact-type interface 80 even when the constant voltage enable signal is not applied, the voltage level recognition unit 60 may sense supply of power and enable the system constant voltage unit 30 (step S530).

In still another embodiment, whether or not to maintain the enabled state of the system constant voltage unit 30 may be determined through the system interface unit 70 (step S540). As described above, the system NFC recognition unit 71 may recognize a case in which the electronic card 400 moves away from an NFC terminal (or a reader) by sensing a level of DC power flowing into the electronic card 400. The system power control unit 72 may receive a power level sensing signal from the system NFC recognition unit 71.

At this point, there may be a case in which the system power control unit 72 determines that power of the system unit 40 should be maintained. For example, it includes a case in which the system unit 40 includes a display unit and needs to operate a few seconds or minutes more, a case in which the sensor of the system unit 40 needs to operate further longer or the like. The system power control unit 72 may transfer a power supply maintaining signal to the voltage level recognition unit 60. When the voltage level recognition unit 60 receives the power supply maintaining signal from the system power control unit 72, the voltage level recognition unit 60 may keep the system constant voltage unit 30 enabled for a predetermined time period.

When the enablement signal is received from the voltage level recognition unit 60, the system constant voltage unit 30 operates to supply power to the system unit 40 (steps S570 and S580). For example, when the system constant voltage unit 30 is implemented in the form of a switch, it can be implemented to supply power by turning the switch to the ON (enabled) state so that power may be supplied to a circuit connected to the system unit 40.

Although the conditions for enabling the system constant voltage unit 30 are described in this embodiment, conditions other than the conditions S520, S560, S530 and S540 described above may be added to stably supply power to the system unit 40.

Like this, according to the embodiments of the present disclosure, as the voltage level recognition unit 60 implements selective enablement of the system constant voltage unit 30 through power monitoring, stable charge of the charging unit 20 is supported, and malfunction of the system unit 40 can be prevented. That is, the charging unit 20 may be intensively charged, and consumption of charged power by natural discharge may be reduced, and the problem of malfunction of the system unit generated when power is simultaneously supplied can be solved.

In addition, the present disclosure may be implemented as a computer-readable code in a computer-readable recording medium. The computer-readable recording medium includes all storage media such as a magnetic storage medium, an optically readable medium, and the like. In addition, data formats of the messages used in the present disclosure can be recorded in the recording medium.

According to the power supply method described in the embodiments of the present disclosure, as the method is implemented to supply power to the system unit only when NFC power is applied, stable operation of the system unit can be supported while reducing the charging time of the charging unit in the electronic card to the maximum. In addition, natural discharge of the power of the charging unit can be prevented.

In addition, as the voltage level recognition unit of the electronic card implements selective enablement of the system constant voltage unit through power monitoring, the charging unit may be intensively charged, consumption of charged power by natural discharge may be reduced, and the problem of malfunction of the system unit generated when power is simultaneously supplied can be solved.

The present disclosure has been described in detail focusing on the preferred embodiments shown in the figures. These embodiments are not intended to restrict the present disclosure and merely for illustrative purposes only and should be considered from the illustrative viewpoint, not the descriptive viewpoint. The true technical protection range of this disclosure should be defined by the technical spirit of the attached claims. Although specific terms have been used in this specification, they have been used merely for the purpose of describing the concept of the present disclosure and have not been used to restrict the meaning or to limit the scope of the present disclosure disclosed in the claims. Each step of the present disclosure is not required to be executed in the particular order disclosed herein and may be executed parallelly, selectively or individually. It will be understood by those skilled in the art that various modified forms and equivalent other embodiments can be made without departing from the spirit of the present disclosure defined in the claims. It should be understood that the equivalents include equivalents that will be developed in the future, as well as the equivalents publicized in present, i.e., all constitutional components invented to perform the same functions regardless of a structure.

What is claimed is:

1. An electronic card comprising:
 a rectification unit for generating DC power by converting current induced from an antenna;
 a charging unit configured to be charged with the DC power supplied from the rectification unit;

a system constant voltage unit for receiving the DC power together with the charging unit and being in a disabled state when a predefined condition is not satisfied, wherein the system constant voltage unit is enabled and supplies power to a system unit when the predefined condition is satisfied; and the system unit for receiving power and operating when the system constant voltage unit is enabled.

2. The electronic card according to claim 1, wherein the predefined condition includes a first condition that the charging unit has a charged capacity higher than a predefined reference value and a second condition of receiving a constant voltage enable signal from the rectification unit.

3. The electronic card according to claim 2, further comprising a voltage level recognition unit for monitoring a power supply state to determine whether the predefined condition is satisfied.

4. The electronic card according to claim 1, further comprising a voltage level recognition unit for monitoring a power supply state to determine whether the predefined condition is satisfied.

5. The electronic card according to claim 4, wherein the voltage level recognition unit determines whether the predefined condition is satisfied and transmits an enablement signal to the system constant voltage unit if the predefined condition is satisfied.

6. The electronic card according to claim 4, wherein the predefined condition further includes a third condition of supplying power through a contact-type interface of the electronic card, and if power is supplied through the contact-type interface, the voltage level recognition unit determines that the predefined condition is satisfied and enables the system constant voltage unit.

7. The electronic card according to claim 4, further comprising a system interface unit for grasping an applied power state and a power use state of the system unit and transferring the states to the voltage level recognition unit, wherein the system interface unit includes:
a system NFC recognition unit for sensing a wireless communication signal received from the rectification unit; and
a system power control unit for transmitting a power supply maintaining signal to the voltage level recognition unit when power of the system unit needs to be maintained.

8. The electronic card according to claim 7, wherein the system power control unit receives a potential level reduction signal from the system NFC recognition unit and transmits the power supply maintaining signal to the voltage level recognition unit if it is determined that power of the system unit needs to be maintained.

9. The electronic card according to claim 8, wherein if the power supply maintaining signal is received, the voltage level recognition unit enables the system constant voltage unit for a predetermined time period regardless of whether the predefined condition is satisfied.

10. The electronic card according to claim 1, wherein the system unit includes a module for implementing at least one application function provided by the electronic card and operates using the power received from the system constant voltage unit.

11. A power supply method implemented in an electronic card, the method comprising steps of:
charging a charging unit through DC power supplied from a rectification unit;
enabling, when a constant voltage enable signal is applied, a system constant voltage unit if a predefined condition is satisfied; and
supplying power to a system unit when the system constant voltage unit is enabled, wherein
the system constant voltage unit receives the DC power together with the charging unit and is in a disabled state when the predefined condition is not satisfied.

12. The method according to claim 11, wherein the predefined condition includes a first condition that the charging unit has a charged capacity higher than a predefined reference value and a second condition of receiving the constant voltage enable signal from the rectification unit.

13. The method according to claim 12, wherein the enablement step includes steps of:
monitoring a power supply state and determining whether the predefined condition is satisfied by a voltage level recognition unit; and
transmitting an enablement signal to the system constant voltage unit and enabling the system constant voltage unit by the voltage level recognition unit when the predefined condition is satisfied.

14. The method according to claim 11, wherein the enablement step includes steps of:
monitoring a power supply state and determining whether the predefined condition is satisfied by a voltage level recognition unit; and
transmitting an enablement signal to the system constant voltage unit and enabling the system constant voltage unit by the voltage level recognition unit when the predefined condition is satisfied.

15. The method according to claim 14, wherein the predefined condition further includes a third condition of supplying power through a contact-type interface of the electronic card, and the enablement step further includes the step of: determining that the predefined condition is satisfied and enabling the system constant voltage unit by the voltage level recognition unit if power is supplied through the contact-type interface.

16. The method according to claim 14, wherein the enablement step includes a step of grasping an applied power state and a power use state of the system unit and transferring the states to the voltage level recognition unit by a system interface unit.

17. The method according to claim 16, wherein the transfer step includes steps of:
sensing a potential level reduction signal through the system interface unit; and
transmitting a power supply maintaining signal to the voltage level recognition unit if it is determined that power of the system unit needs to be maintained.

18. The method according to claim 17, wherein the enablement step further includes a step of enabling the system constant voltage unit for a predetermined time period regardless of whether the predefined condition is satisfied when the voltage level recognition unit receives the power supply maintaining signal.

* * * * *